United States Patent
Abramson et al.

(10) Patent No.: US 9,160,861 B2
(45) Date of Patent: Oct. 13, 2015

(54) MANAGING HELD TELEPHONE CALLS AT THE CALL-FORWARDING SYSTEM

(75) Inventors: Sandra R. Abramson, Freehold, NJ (US); Stephen M. Milton, Freehold, NJ (US)

(73) Assignee: Avaya Inc., Basking Ridge, NJ (US)

( * ) Notice: Subject to any disclaimer, the term of this patent is extended or adjusted under 35 U.S.C. 154(b) by 1676 days.

(21) Appl. No.: 11/201,556

(22) Filed: Aug. 11, 2005

(65) Prior Publication Data

US 2007/0041559 A1 Feb. 22, 2007

(51) Int. Cl.
| | |
|---|---|
| *H04M 7/00* | (2006.01) |
| *H04M 3/54* | (2006.01) |
| *H04M 3/428* | (2006.01) |
| *H04M 3/51* | (2006.01) |
| *H04M 3/42* | (2006.01) |
| *H04M 3/56* | (2006.01) |

(52) U.S. Cl.
CPC .............. *H04M 3/546* (2013.01); *H04M 3/428* (2013.01); *H04M 3/4234* (2013.01); *H04M 3/5125* (2013.01); *H04M 3/4288* (2013.01); *H04M 3/42229* (2013.01); *H04M 3/42314* (2013.01); *H04M 3/56* (2013.01); *H04M 7/006* (2013.01); *H04M 2207/08* (2013.01); *H04M 2207/18* (2013.01)

(58) Field of Classification Search
USPC ............ 379/156, 162, 198, 220.01, 225, 231, 379/234, 393, 88.25, 93.35, 232, 215.01
See application file for complete search history.

(56) References Cited

U.S. PATENT DOCUMENTS

| | | | | |
|---|---|---|---|---|
| 6,026,156 | A * | 2/2000 | Epler et al. ................ | 379/215.01 |
| 6,301,339 | B1 | 10/2001 | Staples et al. | |
| 6,633,635 | B2 | 10/2003 | Kung et al. | |
| 6,961,559 | B1 * | 11/2005 | Chow et al. ................. | 455/414.1 |
| 7,174,189 | B1 * | 2/2007 | Chen et al. .................. | 455/554.1 |
| 2004/0081307 | A1 | 4/2004 | Fujiwara et al. | |
| 2004/0170268 | A1 | 9/2004 | Hakusui | |
| 2005/0141691 | A1 * | 6/2005 | Wengrovitz ............. | 379/211.02 |

FOREIGN PATENT DOCUMENTS

| | | |
|---|---|---|
| JP | 6225011 | 8/1994 |
| WO | 98/53591 A1 | 11/1998 |
| WO | 2004/053646 A2 | 6/2004 |

OTHER PUBLICATIONS

Meister, "International Patent Application No. 06254215.4-2414 Examination Report", Jan. 7, 2008, Publisher: EPO, Published in: DE.

* cited by examiner

*Primary Examiner* — Yosef K Laekemariam
(74) *Attorney, Agent, or Firm* — Maldjian Law Group LLP

(57) ABSTRACT

A method and an apparatus are disclosed that manage the held calls for an off-premises terminal at the system that extends calls to the terminal, such as a private branch exchange or other type of data-processing system, instead of at the system that is receiving the extended calls, such as a mobile switching center at which a cell phone is registered. The disclosed technique is based on the observation that the extending system knows of an incoming call to an off-premises terminal before the receiving system. As a result, the extending system can advantageously select the calls that it holds versus the calls that it sends to the receiving system. The extending system can control the routing costs and provide a consistent look-and-feel of call control to the off-premises terminal user.

15 Claims, 5 Drawing Sheets

MANAGING HELD TELEPHONE CALLS AT THE CALL-FORWARDING SYSTEM

FIELD OF THE INVENTION

The present invention relates to telecommunications in general, and, more particularly, to the handling of one or more held calls, such as in a call-waiting or three-way call scenario.

BACKGROUND OF THE INVENTION

FIG. 1 depicts a schematic diagram of a telecommunications system in the prior art. Telecommunications system 100 comprises:
 i. telecommunications network 101,
 ii. private branch exchange 102,
 iii. on-premises telecommunications terminals 103 and 104,
 iv. data-processing system 108,
 v. off-premises telecommunications terminal 109, and
 vi. network telecommunications terminals 111 and 112,
all of which are interconnected as shown.

Telecommunications network 101 comprises the Public Switched Telephone Network, which is a complex of telecommunications equipment that is owned and operated by different entities throughout the World. In the United States of America, for example, the Public Switched Telephone Network (or "PSTN") comprises an address space that is defined by ten digits, and, therefore, comprises 10 billion unique addresses or "telephone numbers." The public switched telephone networks in other countries are similar.

Network 101 interconnects other telecommunications networks, which include: (i) the cellular network supported by data-processing system 108 and (ii) the enterprise network supported by private branch exchange 102. The cellular network supported by system 108 provides telecommunications service to one or more cellular telecommunications terminals, including terminal 109. The enterprise network supported by exchange 102 provides telecommunications service to one or more telecommunications terminals, for example terminals 103 and 104, within the enterprise area served, such as an office building or campus.

Additionally, network 101 provides telecommunications service to telecommunications terminals that are in the Public Switched Telephone Network, such as terminals 111 and 112. The telecommunications terminals that network 101 serves might be wireline terminals or wireless terminals, or a combination of both.

Data-processing system 108 is a mobile switching center that provides service for cellular phones (e.g., terminal 109, etc.) that are registered with system 108. Alternatively, data-processing system 108 might be a different type of data-processing system than a mobile switching center, such as a wireline switch, a packet router, and so forth. Similarly, terminal 109 might be a different type of terminal than a cellular phone.

Private branch exchange (PBX) 102 is capable of switching incoming calls (e.g., from terminal 111, etc.) from the Public Switched Telephone Network of network 101 via communications paths in trunk group 120 (e.g., path 120-1, path 120-2, etc.) to one or more on-premises terminals, such as on-premises terminals 103 and 104. Private branch exchange 102 is also capable of handling outgoing calls from one or more on-premises terminals to the Public Switched Telephone Network via the communications paths that make up trunk group 120.

Private branch exchange 102 is also capable of forwarding an incoming call, such as from terminal 111, to an "off-premises" terminal, such as terminal 109, that is affiliated with exchange 102 and accessible through network 101. This type of forwarding to a terminal affiliated with exchange 102 is also known as "extending" a call because the connection to the off-premises terminal appears to exchange 102 as an additional PBX line. Exchange 102 extends the call to the off-premises terminal in addition to switching the same incoming call to an "on-premises terminal" within the enterprise area that exchange 102 serves. Terminals 103 and 104 are considered to be on-premises terminals with respect to private branch exchange 102, while terminal 109 is considered to be an off-premises terminal with respect to exchange 102. Note that in telecommunications system 100, terminals 111 and 112 are not considered to be off-premises terminals because, unlike terminal 109, they are not affiliated with exchange 102.

To accomplish (i) the switching of an incoming, enterprise-related call to an on-premises terminal and (ii) the extending of the call to the correct off-premises terminal, private branch exchange 102 maintains a table that correlates the off-premises telephone number to the on-premises, private branch exchange extension. Table 1 depicts a table that illustrates the correlation.

TABLE 1

| On-Premises Telecommunications Terminal | Private Branch Exchange Extension | Telecommunications Network Number |
|---|---|---|
| 103 | 732-555-0102, x11 | 201-555-1236 |
| 104 | 732-555-0102, x12 | 908-555-3381 |
| ... | ... | ... |

PBX Extension-to-PSTN Number Database

As an example, a first caller at terminal 111 who wishes to reach the PBX user of terminal 103 dials the PBX number (i.e., 732-555-0102). Private branch exchange 102 receives the incoming call and the extension number (i.e., x11) as specified by the caller. By using stored information that is similar to the information in Table 1, private branch exchange 102 determines that the call is also to be extended to off-premises telephone number 201-555-1236. This is the telephone number that is associated with off-premises terminal 109, which belongs to the PBX user of terminal 103. Exchange 102 then extends the call to terminal 109 via an available resource, communications path 120-1. The idea behind transmitting the call to both terminal 103 and 109 (or sometimes to terminal 109 only) is that if the PBX user is not reachable at his office phone (i.e., terminal 103), then possibly he is reachable at a phone that is outside of the office (i.e., terminal 109). The extending of the call to an off-premises terminal enhances the caller's experience by only requiring the caller to use a single telephone number to reach the PBX user, regardless of whether or not the PBX user is in the office.

Continuing with the example, a second caller at terminal 112, who also wishes to reach the PBX user of terminal 103, dials the same PBX number as the first caller (i.e., 732-555-0102). Private branch exchange 102 receives the second incoming call and the extension number (i.e., x11) as specified by the second caller, and determines that the second call is also to be extended to off-premises telephone number 201-555-1236, associated with terminal 109. Exchange 102 then extends the second call to terminal 109 via the next available resource, communications path 120-2.

At this point in the example, data-processing system 108 is handling two calls for terminal 109 on two separate communications paths from private branch exchange 102. If terminal 109 terminates only a single PBX line, also known as a "call appearance," data-processing system 108 is responsible for holding the waiting, second call until the user of terminal 109 signals (i.e., "flashes") data-processing system 108 to: (i) put the first call on hold, and (ii) connect the second call to the terminal.

SUMMARY OF THE INVENTION

There are disadvantages for a data-processing system, such as a mobile switching center or central office, to manage the held calls for a telecommunications terminal to which a private branch exchange extends calls. One disadvantage is in cost. It costs more to allocate multiple communications paths between the extending private branch exchange and the data-processing system that is local to the terminal than it would cost to allocate a single path. Another disadvantage is in the user interface. The overall feature functionality that the user of the off-premises terminal is able to access is distributed across the extending private branch exchange and the data-processing system. Therefore, the combined user interface to both systems looks and feels inconsistent to the terminal's user.

The present invention provides a technique to manage the held calls for an off-premises terminal at the system that extends calls to the terminal, such as a private branch exchange or other type of data-processing system, instead of at the system that is receiving the extended calls, such as a mobile switching center at which a cell phone is registered. The technique is based on the observation that the extending system knows of an incoming call to an off-premises terminal before the receiving system. As a result, the extending system can advantageously select the calls that it holds versus the calls that it sends to the receiving system. The extending system can control the routing costs by being able to control the number of communications paths that are allocated for a particular off-premises terminal. In addition, relocating the control of calls to the extending system provides a consistent look-and-feel of call control to the off-premises terminal user who is already using other features that are based in the extending system.

The techniques in the illustrative embodiment are applicable to calls that are held, regardless of where those calls originate from. As a first example, a first call might originate from a terminal that is not associated with the private branch exchange; in this case, the private branch exchange notifies the off-premises terminal of the call waiting, instead of the receiving data-processing system notifying the terminal. As a second example, a second call that is routed through the private branch exchange might originate from the off-premises terminal itself; later on, the private branch exchange, rather than the data-processing system, might swap a held call intended for the off-premises terminal into the communications path that was allocated when the off-premises terminal originated the second call.

A private branch exchange, which is one type of data-processing system, is the call-forwarding system in the illustrative embodiment. As those who are skilled in the art will appreciate, the techniques that are taught in this disclosure can be implemented alternatively in another type of data-processing system (e.g., a central office switch, a packet router, etc.).

For pedagogical purposes, this disclosure focuses primarily on a system in which the off-premises terminal terminates a single call appearance. It will be clear to those who are skilled in the art, after reading this disclosure, how to make and use a telecommunication system in which the terminal terminates multiple call appearances. In the disclosed technique, M calls can be concurrently handled by the private branch exchange in the illustrative embodiment for an off-premises extension that terminates N call appearances, wherein M and N are positive integers, M is greater than or equal to N, and (M−N) is equal to the number of held (or waiting) calls at the private branch exchange.

The illustrative embodiment of the present invention comprises: receiving a second call for a telecommunications terminal that is engaged in a first call, wherein the first call is established via a first communications path between a private branch exchange telephone system and the telecommunications terminal through the Public Switched Telephone Network; and putting the first call on hold at the private branch exchange telephone system.

DETAILED DESCRIPTION

Figure 1:
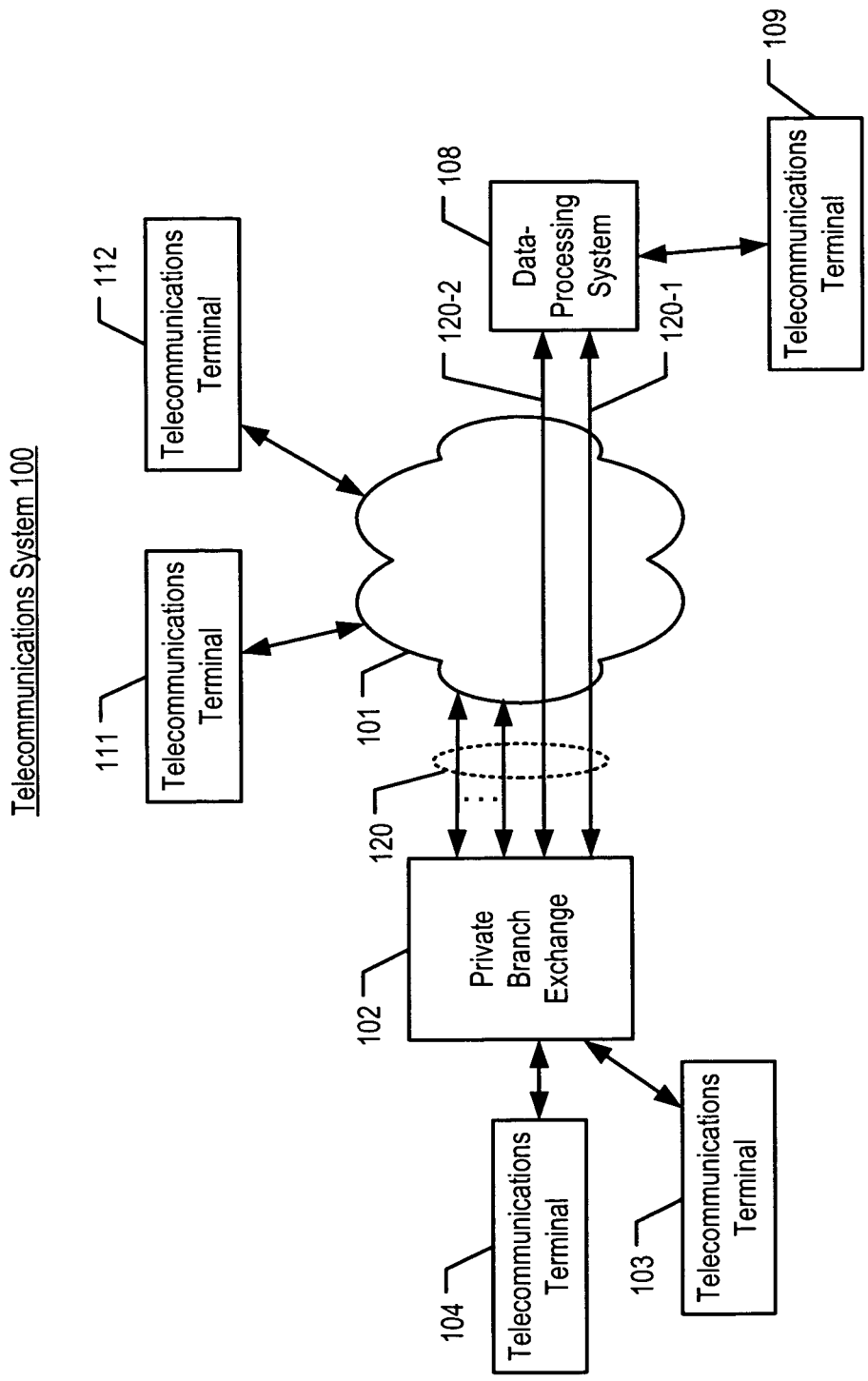
FIG. 1 depicts a schematic diagram of telecommunications system 100 in the prior art.
Figure 2:
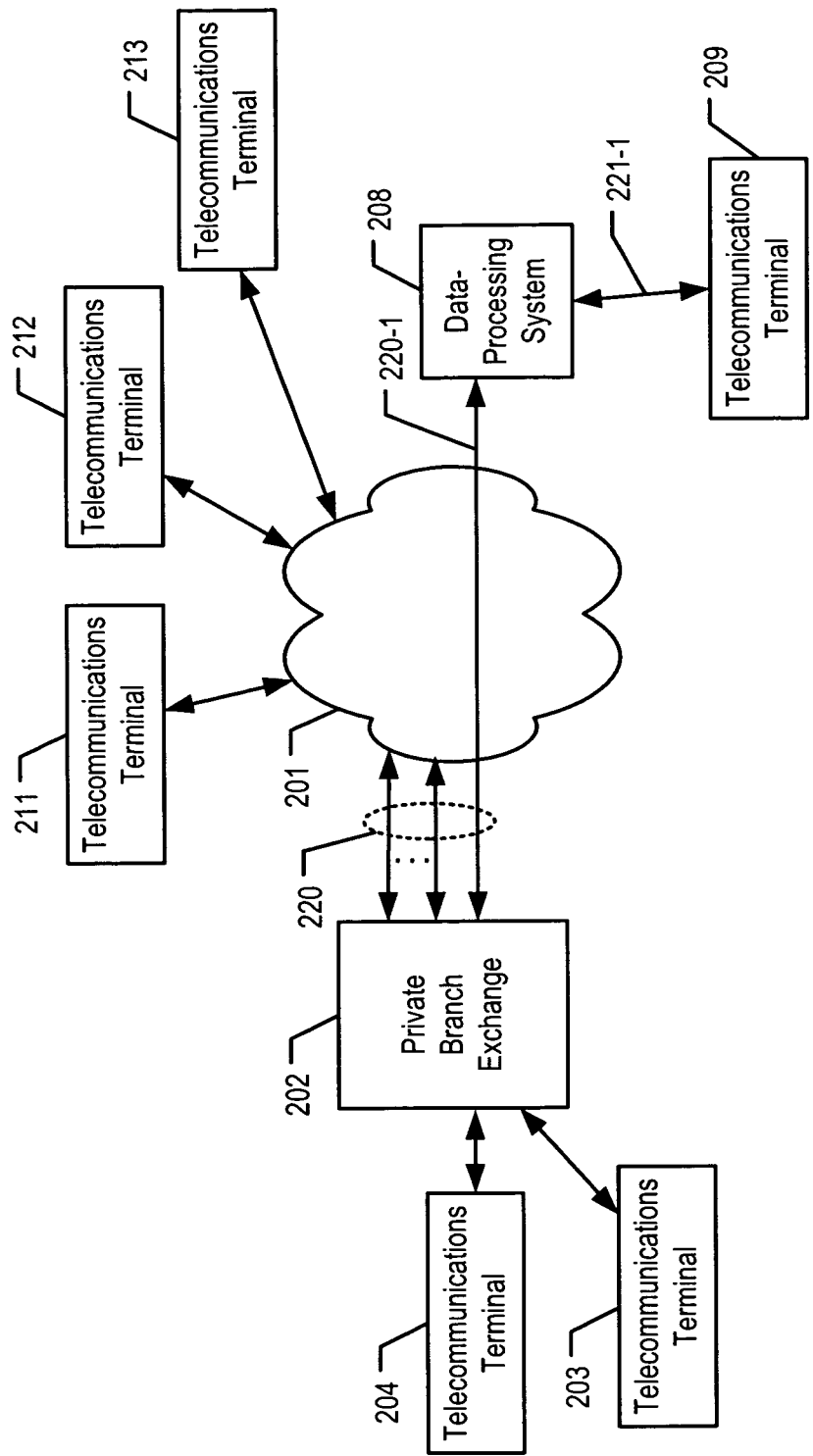
FIG. 2 depicts a first schematic diagram of telecommunications system 200 that comprises private branch exchange telephone system 202, in accordance with the illustrative embodiment of the present invention.

FIG. 2 depicts a schematic diagram of a telecommunications system, in accordance with the illustrative embodiment of the present invention. Telecommunications system 200 comprises:

i. telecommunications network 201,
ii. private branch exchange telephone system 202,
iii. on-premises telecommunications terminals 203 and 204,
iv. data-processing system 208,
v. off-premises telecommunications terminal 209, and
vi. network telecommunications terminals 211, 212, and 213, all of which are interconnected as shown.

Telecommunications network 201 comprises the Public Switched Telephone Network (PSTN), in accordance with the illustrative embodiment. Through Public Switched Telephone Network infrastructure, as well as through other switching and transmission infrastructure, network 201 provides telecommunications service to telecommunications terminals such as terminals 211, 212, and 213.

Network 201 also interconnects multiple telecommunications networks. Those networks include: (i) the enterprise network that private branch exchange 202 supports and (ii) the cellular network that data-processing system 208, a mobile switching center, supports. The enterprise network supported by private branch exchange 202 provides telecommunications service to one or more on-premises telecommunications terminals, including terminals 203 and 204. The cellular network supported by data-processing system 208 provides telecommunications service to one or more cellular telecommunications terminals, including terminal 209.

FIG. 2 also depicts multiple telecommunications terminals of various types. Those terminal types include Plain Old Telephone Service (POTS) terminals, as exemplified by terminal 211; office desksets, as exemplified by terminals 203 and 204; cell phones, as exemplified by terminal 209; and so forth. As those who are skilled in the art will appreciate, the present invention is also applicable to other combinations of terminals than what FIG. 2 depicts.

Private branch exchange 202 is a data-processing system, the salient components of which are described below and with respect to FIG. 3. Private branch exchange 202 is capable of switching incoming calls (e.g., from terminal 211, etc.) from the Public Switched Telephone Network via one or more communications paths in trunk group 220 to on-premises terminals, such as terminals 203 and 204. Exchange 202 is also capable of handling outgoing calls from on-premises terminals to the Public Switched Telephone Network via one or more communications paths in trunk group 220.

Private branch exchange 202 is also capable of forwarding an incoming call to a terminal other than the terminal at the called telephone number. Specifically, exchange 202 is capable of extending an incoming call (e.g., from terminal 211, etc.) to a telephone number of an "off-premises" terminal. From exchange 202's perspective, an "off-premises" terminal is one that is accessible through the Public Switched Telephone Network (e.g., via communications path 220-1, etc.), while still being affiliated with exchange 202 as an extension to the enterprise network supported by exchange 202. Exchange 202 is capable of extending the incoming call to the off-premises terminal in addition to (or independently of) switching the same incoming call to an on-premises terminal within the enterprise area (e.g., an office building, etc.) that is served by exchange 202. For pedagogical purposes, terminal 209 is an off-premises terminal in telecommunications system 200.

Private branch exchange 202 is connected to telecommunications systems that are present in network 201 via ISDN trunks, as are known in the art. Each communications path **220-*i*, wherein i is a value greater than zero and less than or equal to the number of trunks in trunk group 220, comprises an ISDN trunk in accordance with the illustrative embodiment. As those who are skilled in the art will appreciate, in some alternative embodiments, exchange 202 might have additional trunk groups than depicted in FIG. 2. Moreover, as those who are skilled in the art will appreciate, exchange 202 might be connected to network 201 via other types of communications paths. For example, exchange 202** might receive at least some of the incoming calls via the Session Initiation Protocol over an Internet Protocol-based network.

It will be clear to those skilled in the art, after reading this disclosure, how to make and use alternative embodiments of the present invention in which private branch exchange 202 provides telecommunications service to a different number of on-premises terminals and to a different number off-premises terminals than those depicted.

Private branch exchange 202 is also capable of performing the tasks described below and with respect to FIG. 4, in accordance with the illustrative embodiment. It will be clear to those skilled in the art, after reading this disclosure, how to make and use private branch exchange 202. Moreover, as those who are skilled in the art will appreciate, there can be alternative embodiments of the present invention in which, for example, a switch or another type of data-processing system (i.e., other than the private branch exchange telephone system in the illustrative embodiment) performs the described tasks. The data processing systems in those alternative embodiments inter-operate with the Public Switched Telephone Network that constitutes network 201, with another type of network (e.g., an Internet Protocol-based network, a wireless network, etc.), and so forth. Putting it differently, the present invention is equally well suited for implementation in public and private telecommunications systems, and in wireline and wireless systems as well.

Data-processing system 208, a mobile switching center, is capable of switching incoming calls from the Public Switched Telephone Network via one or more communications paths to cellular terminals, such as terminal 209. Data-processing system 208 is also capable of handling outgoing calls from cellular terminals to the Public Switched Telephone Network via one or more communications paths. System 208 communicates with terminal 209 via one or more radio base stations, in well-known fashion. It will be clear to those skilled in the art how to make and use data-processing system 208.

In accordance with the illustrative embodiment of the present invention, data-processing system 208 is a mobile switching center and off-premises terminal 209 is a cell phone. As those who are skilled in the art will appreciate, in some alternative embodiments, data-processing system 208 might be a different type of data-processing system, such as a wireline switch, a packet router, and so forth. Correspondingly, off-premises terminal 209 might be, in those alternative embodiments, a different type of terminal, such as a wireline deskset, a softphone, and so forth.

For pedagogical purposes, this disclosure focuses primarily on a system in which telecommunications terminal 209 terminates a single call appearance, as represented by communications path 221-1. As will be described below and with respect to FIGS. 4 and 5, however, some off-premises terminals in some variations of the illustrative embodiment terminate multiple call appearances.

Figure 3:
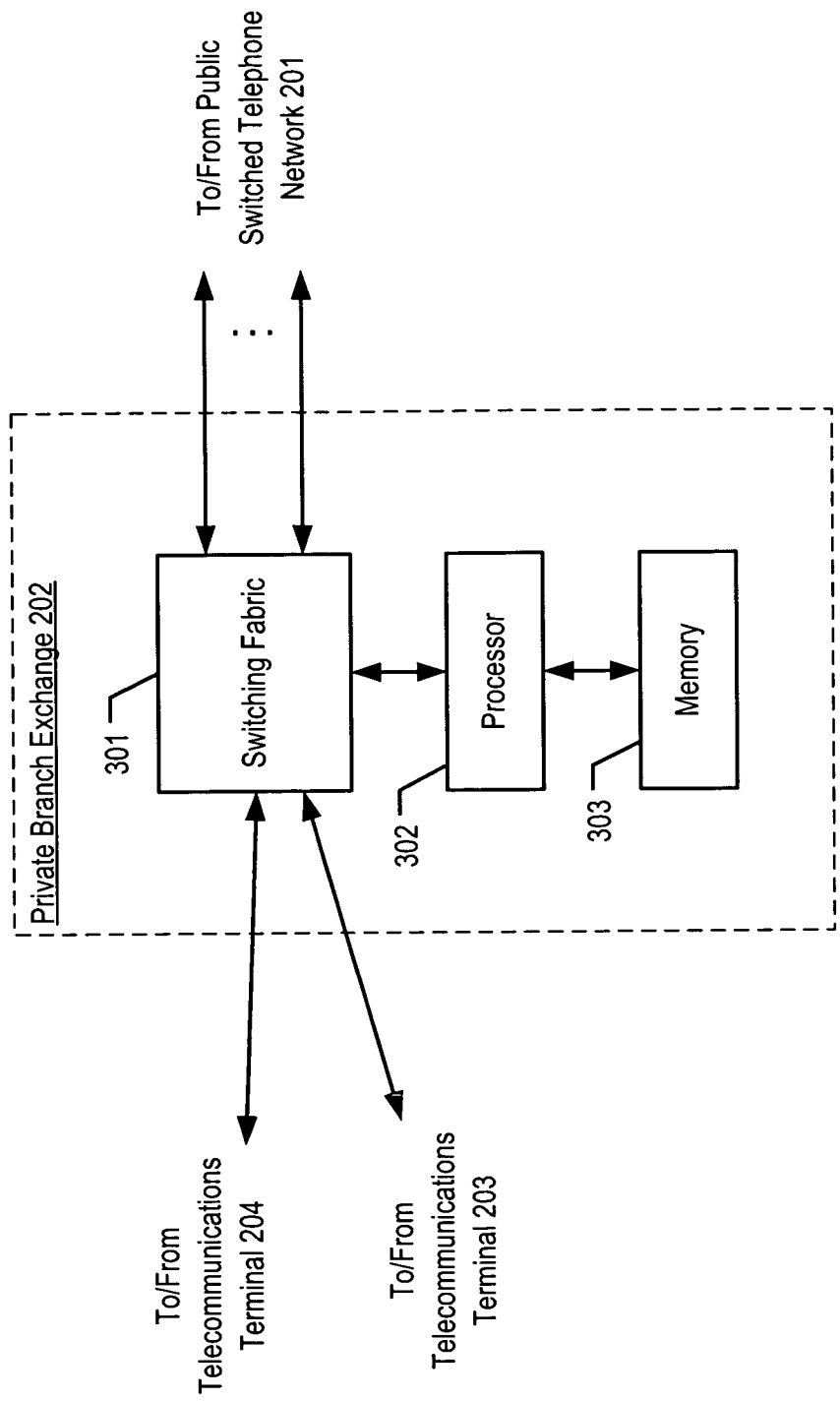
FIG. 3 depicts a block diagram of the salient components of private branch exchange 202, in accordance with the illustrative embodiment of the present invention.

FIG. 3 depicts a block diagram of the salient components of private branch exchange 202 in accordance with the illustrative embodiment of the present invention. Private branch exchange 202 comprises: switching fabric 301, processor 302, and memory 303, interconnected as shown.

Switching fabric 301 is capable of performing all of the tasks described below and with respect to FIG. 4 under the direction of processor 302. It will be clear to those skilled in the art, after reading this disclosure, how to make and use switching fabric 301.

Processor 302 is a general-purpose processor that is capable of receiving called-related data from switching fabric 301, of reading data from and writing data to memory 303, and of executing the tasks described below and with respect to FIG. 4. In some alternative embodiments of the present invention, processor 302 might be a special-purpose processor. In either case, it will be clear to those skilled in the art, after reading this disclosure, how to make and use processor 302.

Memory 303 is a non-volatile random-access memory that stores the instructions and data used by processor 302. Memory 303 stores the PBX on-premises extension and affiliated off-premises telephone number for each PBX user, which are shown in Table 1. It will be clear to those skilled in the art, after reading this disclosure, how to make and use memory 303.

Figure 4:
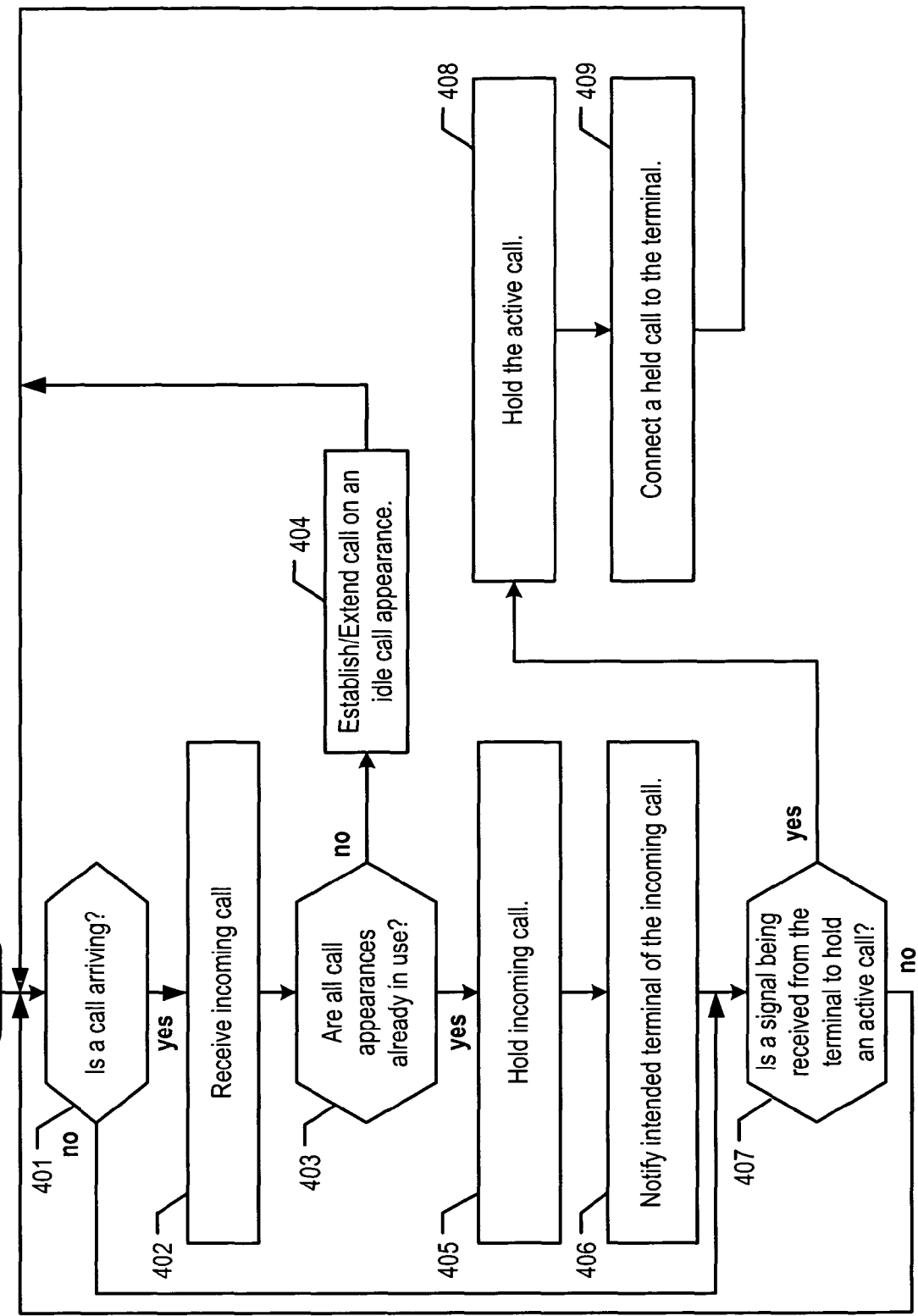
FIG. 4 depicts a flowchart of the salient tasks associated with private branch exchange 202 handling one or more held calls that are associated with telecommunications terminal 209.

FIG. 4 depicts a flowchart of the salient tasks associated with private branch exchange 202 handling one or more held calls that are associated with telecommunications terminal 209, in accordance with the illustrative embodiment of the present invention. It will be clear to those skilled in the art which tasks depicted in FIG. 4 can be performed simultaneously or in a different order than that depicted.

At task 401, private branch exchange 202 checks if a call is arriving. If a call is arriving, task execution proceeds to task 402. If not, task execution proceeds to task 407.

At task 402, exchange 202 receives, in well-known fashion, an incoming call that is associated with off-premises terminal 209. As an example, the called telephone number of the incoming call might map to one or more terminals that include off-premises terminal 209. As another example, the incoming call might originate from off-premises terminal 209 and be intended for another terminal (e.g., terminal 203, terminal 211, etc.).

At task 403, exchange 202 determines whether or not all call appearances that terminate at terminal 209 are already in use. If all call appearances that terminate at terminal 209 are already in use, task execution proceeds to task 405. If not, task execution proceeds to task 404.

At task 404, exchange 202 establishes the call on an idle call appearance. For example, if the incoming call is intended for terminal 209, exchange 202 extends the call to terminal 209 using an idle call appearance. Task execution then proceeds to task 401.

At task 405, exchange 202 holds the arrived call in well-known fashion. As those who are skilled in the art will appreciate, exchange 202 might continue to transmit a ringing tone to the calling party or might provide some other type of feedback or information to the calling party.

At task 406, exchange 202 notifies the intended terminal of the arrived call that is being held. For example, if terminal 209 is the called terminal, exchange 202 transmits a call-waiting indication in well-known fashion.

At task 407, exchange 202 checks if it is receiving a signal from off-premises terminal 209 to hold an active call. If it is receiving the signal, task execution proceeds to task 408. If not, task execution proceeds to task 401.

At task 408, exchange 202 holds the active call in well-known fashion. This has the effect of freeing up a call appearance at terminal 209.

At task 409, optionally, exchange 202 connects a held call to terminal 209 by using an idle call appearance. Alternatively, the user of terminal 209 can use the idle call appearance to originate a new call. Task execution then proceeds to task 401.

In a first example that illustrates some of the described tasks, a user of private branch exchange 202, who is a technical support representative, is available to accept calls from customers. The PBX user is at his cell phone, off-premises terminal 209, which has a single call appearance.

Private branch exchange 202 receives an incoming first call from a first customer. The customer is using his home phone, network terminal 211, to call for technical support. The customer calls a first telephone number (i.e., the called telephone number), "1-800-555-TECH," which is associated with private branch exchange 202 and, as a result, routes through network 201 to exchange 202. Exchange 202 determines that the call is to be extended to terminal 209, which is at a second telephone number, "973-555-1324." Exchange 202 extends the call to terminal 209.

A second customer calls into private branch exchange 202 (i.e., calls "1-800-555-TECH") for technical support. Exchange 202 receives the incoming second call and determines, in well-known fashion, that the second call should also be extended to the tech support rep at terminal 209. However, because the only call appearance of terminal 209 is already in use (i.e., there are no available call appearances), exchange 202 holds the incoming second call and notifies terminal 209 (i.e., the "intended" terminal) of the call that is waiting. Exchange 202 might notify terminal 209 by a "call waiting" tone, or provide caller identification information to terminal 209, or do both.

Private branch exchange 202 then receives a signal from terminal 209, in which the signal indicates that terminal 209's user wishes to put the first call on hold. The user specifies the hold by selecting a function that results in terminal 209 generating a signal that exchange 202, in turn, recognizes as a hold command (but which is not detectable by data-processing system 208). Exchange 202 puts the first call (i.e., the active call) on hold in response to having received the signal. Exchange 202 then connects the held, second call to terminal 209 on the now-available call appearance.

In a second example that illustrates some of the described tasks, a user of private branch exchange 202, who is a technical support representative, is available to accept calls from customers. The PBX user is at his cell phone, off-premises terminal 209, which has a single call appearance. The tech support rep is already engaged in a first call at terminal 209, wherein the first call has been established through private branch exchange 202. Exchange 202 might have extended the call to the tech support rep's terminal, or the tech support rep might have initiated the call by calling back a particular customer (i.e., at terminal 211) through exchange 202.

The PBX user of off-premises terminal 209 then wishes to call a subject matter expert for the purpose of conferencing the expert onto the call. However, since the only call appearance of terminal 209 is already in use for the first call, the user has to signal exchange 202 to put the first call on hold. The user specifies the hold by selecting a function that results in terminal 209 generating a signal that exchange 202, in turn, recognizes as a hold command. The user then makes the second call to the subject matter expert.

Private branch exchange 202 receives the signal from terminal 209, in which the signal indicates that terminal 209's user wishes to put the first call on hold. Exchange 202 puts the first call (i.e., the active call) on hold in response to having received the signal. Exchange 202 then receives the second call from terminal 209, and routes the call through to the called party at her branch office phone, terminal 212.

Meanwhile, exchange 202 continues to receive additional calls, in which terminal 209 is the intended receiving terminal for at least some of the calls. Each time, exchange 202 transmits a call-waiting indication to terminal 209, which provides information about each caller to the user of terminal 209. Each call for which an idle call appearance is not available is held at private branch exchange 202, as opposed to data-processing system 208.

Private branch exchange 202 then receives a second signal from terminal 209 that specifies to conference in the subject matter expert of the second call. The user specifies the conferencing in by selecting a function that results in terminal 209 generating a signal that exchange 202, in turn, recognizes as a conference command (but which is not detectable by data-processing system 208). Exchange 202 then joins the second call to the first call as part of a three-way call.

Figure 5:
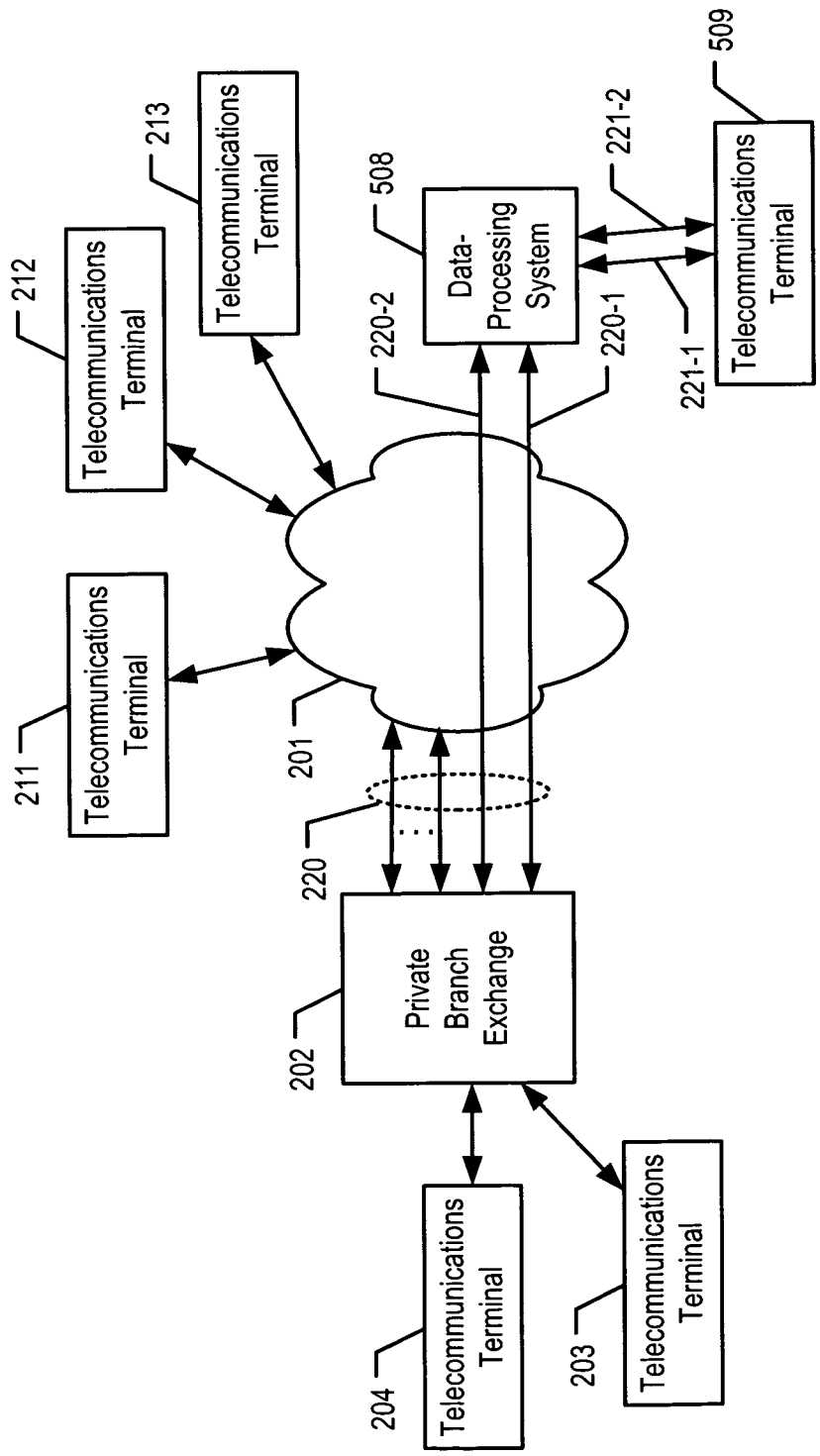
FIG. 5 depicts a second schematic diagram of telecommunications system 200, in accordance with the illustrative embodiment of the present invention.

A third example that illustrates some of the described tasks is depicted in FIG. 5 and involves off-premises terminal 509, which terminates two call appearances instead of only one appearance. Terminal 509 is supported by data-processing system 508, which is also capable of handling two call appearances per terminal. It will be clear to those skilled in the art how to make and use system 508 and terminal 509. In the example, a user of private branch exchange 202, who is a technical support representative, has already signaled for exchange 202 to put a first call that involves a first customer on hold. Also, exchange 202 has already connected a second call that involves a second customer who is using terminal 212 to communicate; the second call has been connected to terminal 509 via a first communications path.

The PBX user is at his home phone, off-premises terminal 509, which is served by system 508, a central office switch. The user is able to toggle between the two call appearances within his phone. The first call appearance is enabled by communications path 220-1 and 221-1. The second call appearance is enabled by communications path 220-2 and 221-2.

Meanwhile, terminal 509 is also engaged in a third call with a third customer that exchange 202 has established on the second communications path. The user of terminal 509, however, wishes to talk with the first customer (on the held first call) and indicates this to exchange 202. Private branch exchange 202 then receives a signal from terminal 509, in which the signal indicates that terminal 509's user wishes to put the third call on hold. The user specifies the hold by selecting a function that results in terminal 509 generating a signal that exchange 202, in turn, recognizes as a hold command. Exchange 202 puts the specified active call on hold in response to having received the signal. Exchange 202 then connects the held first call to terminal 509 on the now-available call appearance enabled by the second communications path.

It is to be understood that the above-described embodiments are merely illustrative of the present invention and that many variations of the above-described embodiments can be devised by those skilled in the art without departing from the scope of the invention. For example, in this Specification, numerous specific details are provided in order to provide a thorough description and understanding of the illustrative embodiments of the present invention. Those skilled in the art will recognize, however, that the invention can be practiced without one or more of those details, or with other methods, materials, components, etc.

Furthermore, in some instances, well-known structures, materials, or operations are not shown or described in detail to avoid obscuring aspects of the illustrative embodiments. It is understood that the various embodiments shown in the Figures are illustrative, and are not necessarily drawn to scale. Reference throughout the specification to "one embodiment" or "an embodiment" or "some embodiments" means that a particular feature, structure, material, or characteristic described in connection with the embodiment(s) is included in at least one embodiment of the present invention, but not necessarily all embodiments. Consequently, the appearances of the phrase "in one embodiment," "in an embodiment," or "in some embodiments" in various places throughout the Specification are not necessarily all referring to the same embodiment. Furthermore, the particular features, structures, materials, or characteristics can be combined in any suitable manner in one or more embodiments. It is therefore intended that such variations be included within the scope of the following claims and their equivalents.

What is claimed is:

1. A method comprising:
receiving, at a private branch exchange (PBX) telephone system, a first call to an on-premises telecommunications terminal that is on-premises to the PBX telephone system;
extending the first call via a first communications path between the private branch exchange telephone system and an off-premises telecommunications terminal, the first communications path passing through a data-processing system in the Public Switched Telephone Network;
receiving, at the private branch exchange telephone system, a second call for the on-premises telecommunications terminal already engaged in the first call; and
putting the first call on hold at the private branch exchange telephone system, prior to transmitting the call to the data-processing system, based on i) the receiving of the second call, and ii) all call appearances that are associated with the off-premises telecommunications terminal being already in use;
wherein the data-processing system is itself capable of i) switching incoming calls to multiple off-premises telecommunications terminals, and ii) putting on hold the first call, which is already in progress at the off-premises telecommunications terminal, prior to the first call having been placed on hold at the private branch exchange.

2. The method of claim 1 wherein the putting of the first call on hold is also in response to a signal that is received from the off-premises telecommunications terminal after the receiving of the second call.

3. The method of claim 2 further comprising connecting the second call to the off-premises telecommunications terminal via the first communications path after the putting of the first call on hold.

4. The method of claim 1 wherein the telephone number of the off-premises telecommunications terminal is coupled with a first telephone number that exists within the address space of the private branch exchange telephone system.

5. The method of claim 1 wherein the first communications path comprises an Integrated Services Digital Network trunk that is connected to the private branch exchange telephone system.

6. The method of claim 1 wherein the off-premises telecommunications terminal is also engaged in a third call that was established on a second communications path between the private branch exchange telephone system and the off-premises telecommunications terminal through the data-processing system.

7. The method of claim 6 further comprising:
putting the third call on hold at the private branch exchange telephone system; and
connecting the first call to the off-premises telecommunications terminal via the second communications path.

8. The method of claim 1 wherein the second call is received via the Session Initiation Protocol.

9. The method of claim 1 further comprising transmitting, from the private branch exchange telephone system, a notification of the second call to the off-premises telecommunications terminal.

10. A method comprising:
extending, from a private branch exchange telephone system, a first call to a telecommunications terminal at a second telephone number that routes to a data-processing system, wherein the called number of the first call is a first telephone number that is associated with the private branch exchange telephone system and wherein the second telephone number is an off-premises that is correlated to the first telephone number by use of a database stored within the private branch exchange telephone system;
receiving, at the private branch exchange telephone system, a second call while the first call is in progress, wherein the called number of the second call is also the first telephone number; and transmitting, from the private branch exchange telephone system and through the data-processing system, a notification of the second call to the telecommunications terminal without connecting the second call to the data-processing system or to the telecommunications terminal.

11. The method of claim 10 further comprising:
extending, from the private branch exchange telephone system, a third call to the telecommunications terminal;
wherein the second call is received while the third call is also in progress.

12. The method of claim 11 wherein the called number of the third call is also the first telephone number.

13. The method of claim 10 wherein the notification comprises a call-waiting indication.

14. The method of claim 10 wherein the second call is received via the Session Initiation Protocol.

15. The method of claim 10 wherein the first call is extended to the telecommunications terminal via a communications path that comprises an Integrated Services Digital Network trunk that is connected to the private branch exchange telephone system.

* * * * *